United States Patent [19]
Spisak

[11] 3,774,005
[45] Nov. 20, 1973

[54] CHUCKING MEANS FOR LARGE FLANGED STUDS WHEN AUTOMATICALLY FEEDING STUDS THRU REAR OF CHUCK

[75] Inventor: Steve Spisak, Elyria, Ohio
[73] Assignee: TRW Inc., Cleveland, Ohio
[22] Filed: Apr. 23, 1970
[21] Appl. No.: 31,181

[52] U.S. Cl. .............................................. 219/98
[51] Int. Cl.............................................. B23k 9/20
[58] Field of Search ............. 219/98, 99, 75, 150.5; 29/212 T; 279/43, 38, 56, 51; 221/185; 227/147

[56] References Cited
UNITED STATES PATENTS

| | | |
|---|---|---|
| 2,056,963 | 10/1936 | Fuchs et al. .......................... 279/43 |
| 2,938,106 | 5/1960 | Hawthorne .......................... 219/125 |
| 3,258,835 | 6/1966 | Boggild et al. ........................ 29/212 |
| 3,293,402 | 12/1966 | Graham ................................. 219/98 |
| 3,352,996 | 11/1967 | Neumeier .............................. 219/98 |

*Primary Examiner*—R. F. Staubly
*Attorney*—Allen D. Gutchess, Jr.

[57] ABSTRACT

A chuck assembly for holding headed studs by the shank including a split sleeve for holding the shank as the stud is passed head first through the resilient tapered fingers of the chuck. The fingers of the chuck are first spread open to pass the head then allowed to snap onto the outside surfaces of the split sleeve forcing it into abutting circumscribed holding relation with the shank.

5 Claims, 4 Drawing Figures

INVENTOR
STEVE SPISAK
BY
Gordon Needleman
ATTORNEY

INVENTOR
STEVE SPISAK
BY
*Gordon Needleman*
ATTORNEY 3,774,005

CHUCKING MEANS FOR LARGE FLANGED STUDS WHEN AUTOMATICALLY FEEDING STUDS THRU REAR OF CHUCK

BACKGROUND OF THE INVENTION

Generally speaking, rear loading of non-headed studs in a stud welding gun is shown to be old in the art by the patent to Graham, U. S. Pat. No. 3,293,402 which uses a ram to push nonflanged welding studs into a holding member utilizing a flexible sealed sleeve under air pressure. The patent to Spisak, U. S. Pat. No. 3,339,799 also shows a rear loaded gun.

It is true that there are some types of devices which rear load headed fastener members. For example, the patent to Frank, U. S. Pat. No. 2,445,026 issued July 13, 1948, is an example of a rear loaded gun for attaching headed rivets. Note also the patent to Crossen, U. S. Pat. No. 2,911,645 issued Nov. 10, 1959, which feeds nails. There are also tire stud inserters such as the patent to Boggild et al., U. S. Pat. No. 3,258,835 issued July 5, 1966, and the patent to Karlsson, U. S. Pat. No. 3,398,446 issued Aug. 27, 1968.

The rear loaded stud welders cited above are not adapted for the feeding of a headed stud having a head with a larger diameter than the chuck and the plunger element is not adapted to receive the shank of such a member. The headed fasteners which are rear loaded are those examplified by the tire stud inserters which feed members either head or tail first. None of them however are directed at stud welding. Note that the Graham patent at FIG. 2 and the Napoli U. S. Pat. No. 3,371,184 issued Feb. 27, 1968, still cling to the idea of a front loading concept which in the opinion of the inventor constitutes evidence that the references alone would not have made the present invention obvious to one skilled in the art.

SUMMARY OF THE INVENTION

It is an object of the present invention to provide a chuck assembly for welding tool having means of compressing a split sleeve attached to a plunger onto the shank of a headed stud.

A further object of the present invention is to provide a chuck assembly for a welding tool which is adapted to receive a stud head first, hold it by the shank with a split sleeve, spread the chuck fingers to pass the stud head and then have the fingers engage the split sleeve tightly and circumferentially.

A still further object of the present invention is to provide a chuck assembly having automatic feed means and having a plunger with a split sleeve on its forward end adapted to engage the shank of a headed stud and push it through a flexible fingered chuck.

DESCRIPTION OF THE PREFERRED EMBODIMENT

Figure 1:
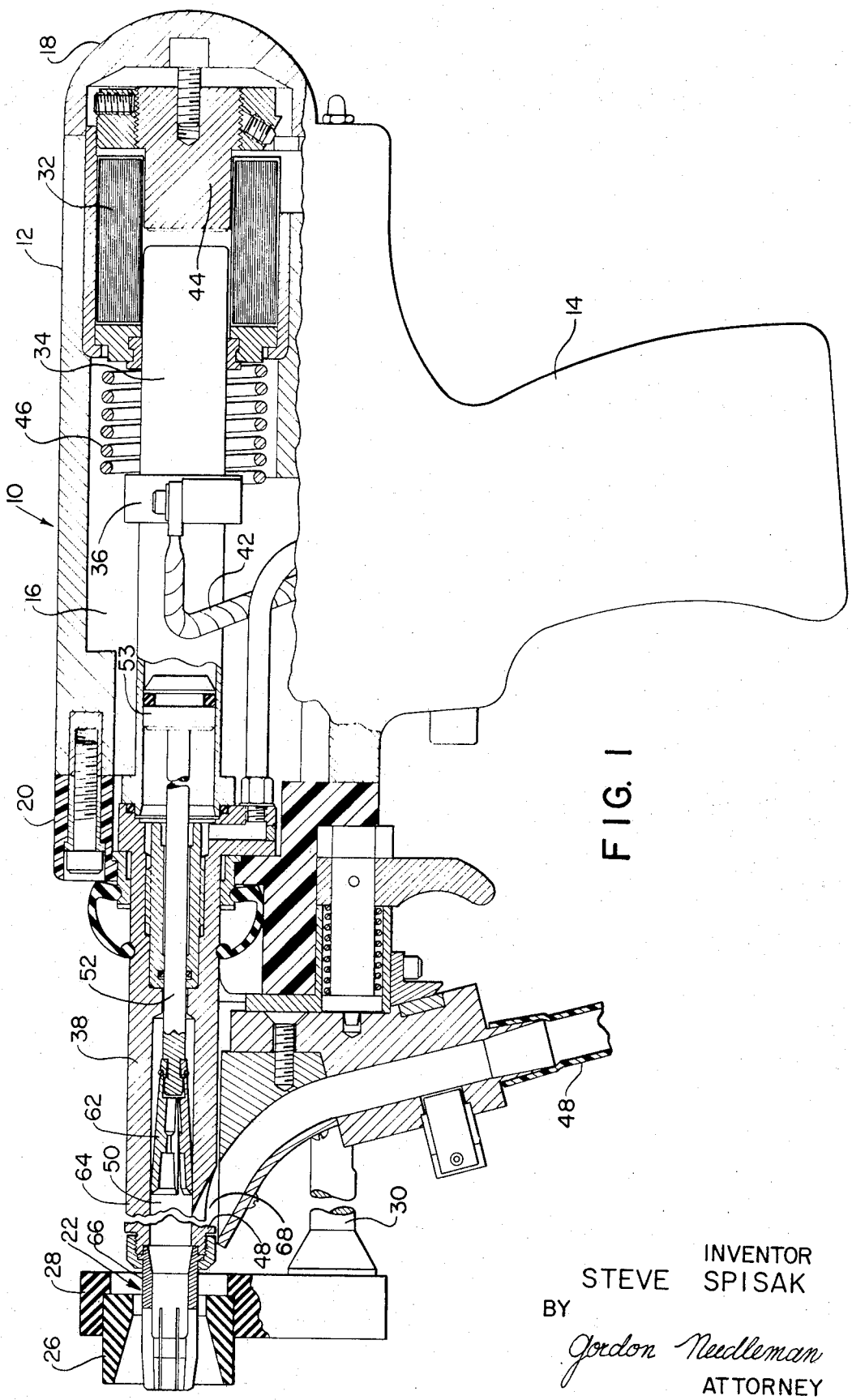
FIG. 1: Is an elevated view partially in section of the welding gun.
Figure 2:
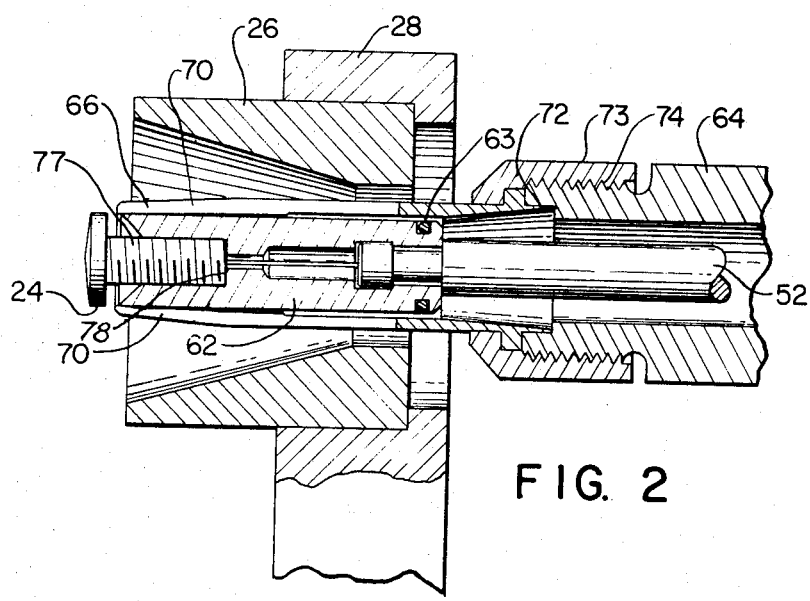
FIG. 2: Vertical section disclosing the chuck assembly.
Figure 3:
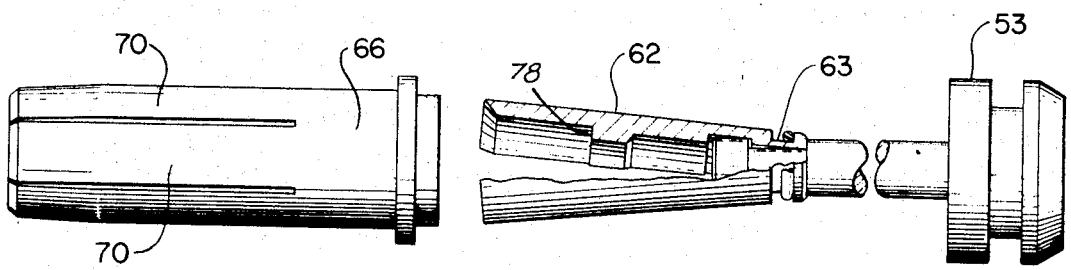
FIG. 3: Exploded view of the chuck assembly with a portion broken away.
Figure 4:
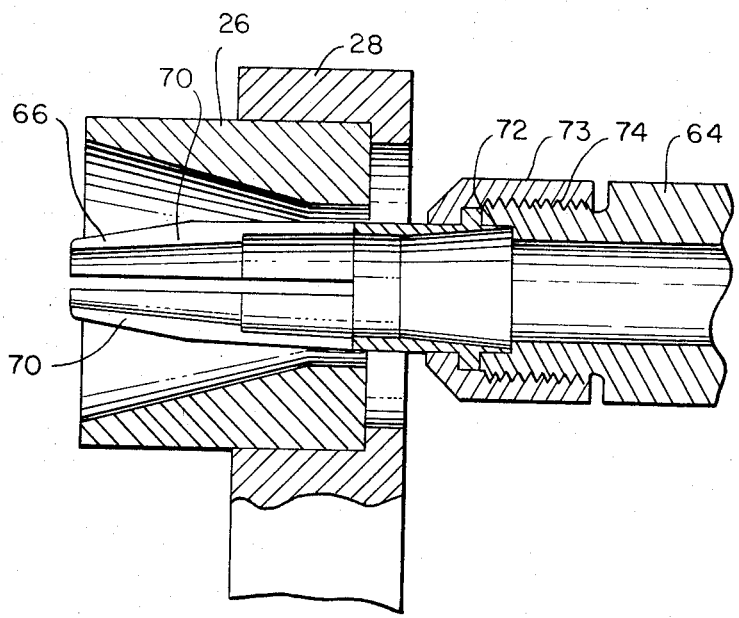
FIG. 4 is a vertical section disclosing the chuck assembly.

The welding tool 10 includes a main housing 12 of dielectric material and an integral handle 14. The housing 12 has a main chamber 16 closed at the rear end by an insulating cap 18 and at the forward end by a front wall 20. A chuck assembly 22 is located at the front of the tool 10 and receives and positions a stud 24 during the welding operation. The chuck assembly 22 is surrounded by a suitable spark shield 26 attached to a welding foot 28 which is adjustably held by two supporting legs 30 as is well known in the art. An electrical lifting and holding coil 32 is located at the rear portion of the chamber 16. A movable solenoid core 34 is connected to a rear cable clamp part 36 and extends into the electrical lifting and holding coil 32. The core 34 is retracted when current is supplied to the coil 32.

The chuck assembly 22 is attached to a chuck leg 38 which is electrically connected to the cable clamp 36. The chuck leg 38 is slidably supported by the front wall 20. Current is supplied to the stud 24 through a main flexible welding cable 42 through the clamp 36, the chuck leg 38 and through the chuck assembly 22.

The rearward movement of the core 34 which determines the extent of the lift of the chuck assembly 22 and the stud 24 is limited by an adjustable core or stop 44. A return or plunge spring 46 returns the stud 24 to the workpiece when the current to the lifting and holding coil 32 is shut off.

The studs 24 are fed automatically to the chuck assembly 22 by suitable feed means which in this instance includes a flexible feed tube 48. The studs 24 are fed head first into a loading chamber 50 and continue into a passage in the chuck assembly 22. A plunger 52 is pneumatically driven by means of a piston 53 which reciprocates in the chuck leg 38. A sleeve 62 is slit lengthwise to form three arced sections or leaves. The leading end of the sleeve 62 is bell mouthed or beveled while the trailing end has a circumferential groove 63 and includes notched sections which fit within a circumferential groove formed on the plunger 52. The notched sections of the sleeve are fitted into the groove of the plunger 52 and held in place by a resilient, circular member in the form of an O-ring or spring fitted within the circumferential groove 63. The leading end of the sleeve 62 is adapted to abut the inner wall of the loading portion 64 and the chuck 66.

The chuck assembly 22 includes a stud receiving or loading portion 64 and a chuck 66 attached thereto. The loading portion 64 includes the loading chamber 50 which is circular in cross section and has a diameter slightly larger than the diameter of the head of the stud 24.

The chuck 66 has a central longitudinal passage with a slightly chamfered opened end communicating with the loading chamber 50. The forward end of the chuck has a plurality of slots dividing the end into resilient fingers 70 which are angled inwardly to provide an opening smaller in diameter than the diameter of the stud head.

The chuck 66 has an annular projection 72 which extends into a recess in the chuck leg 38 to aid in orienting the central passage with the loading chamber 50 and is held in this position by a chuck nut 73. The chuck nut 73 has an internal thread 74 mating with the external thread of the chuck leg 38 to securely hold the chuck 66 relative to the stud receiving portion 64. The stud receiving portion 64 also has a transverse inlet 68 which acts as the passage between the feed tube 48 and the loading chamber 50. When the stud 24 reaches the chamber 50 it immediately moves into the chuck 66 and is held in position by the chuck fingers 70 until it is moved forward by the plunger 52.

From the above, it will be seen that the chuck 66 can be relatively easily replaced without disturbing the stud receiving portion 64 simply by unscrewing the nut 73 from the stud receiving portion 64. This ease of removal is required because the tip or fingers 70 are occasionally damaged and require replacement.

The loading cycle starts when the stud 24 is blown headfirst into the loading chamber 50 and then into the chuck 66. The plunger 52 starts moving forward engaging the split sleeve 62 on its forward end with the shank and continues to move until the shank end 77 of the stud 24 abutts a stud stop 78 in the split sleeve 62. At this time, the chamfer of the chuck has compressed the sleeve 62 to a diameter slightly greater than the outside diameter of the shank of the sutd and the leaves of the sleeve 62 loosely encircle the shank of the stud. The head of the stud 24 will dilate the spring fingers 70. When the head passes the fingers 70, they will snap down onto the split sleeve 62 forcing it to closely circumscribe the shank of the stud holding it in position for the welding operation. The stud can now be welded to a workpiece in the usual manner.

I claim:

1. A stud welding tool for use with a stud having a head and a shank, said tool having a plunger, plunger means for reciprocating the plunger, means forming a loading chamber for receiving the stud, said chamber means being connected to said tool with the chamber aligned with the plunger and in the path thereof, said chamber means also forming a transverse inlet for receiving studs one at a time therethrough, a chuck at the forward end of said chamber means in alignment with said chamber, said chuck having fingers at a forward end thereof and having an inner wall of cylindrical cross section, a plurality of separate sleeve sections having rear portions pivotally mounted on said plunger, resilient means engageable with said sleeve sections rearwardly of the rear portions and urging the forward portions of said sleeve sections outwardly toward the inner wall of said chuck, whereby the forward ends of said sleeve sections can be more easily received around the shank of the stud.

2. A stud welding tool according to claim 1 characterized by said sleeve sections having notches to the rear of said rear portions thereof, said notches forming an annular groove around said sleeve sections and said resilient means comprising a resilient circular member in said groove.

3. A stud welding tool according to claim 2 characterized by said plunger having an enlarged portion at the forward end thereof on which said sleeve portions are pivoted, and said plunger having a groove therearound behind said enlargement.

4. Apparatus according to claim 1 characterized by each of said sleeve sections having inwardly and rearwardly extending forward beveled edges.

5. A stud welding tool according to claim 1 characterized by said sleeves having stud stops spaced from the forward edges thereof to receive the rearwardly extending end of the stud shank.

* * * * *